US012418526B1

(12) United States Patent
Xu et al.

(10) Patent No.: US 12,418,526 B1
(45) Date of Patent: Sep. 16, 2025

(54) MOBILE DEVICE USER AUTHORIZATION SYSTEM

(71) Applicant: Amazon Technologies, Inc., Seattle, WA (US)

(72) Inventors: Xiang Xu, New Hyde Park, NY (US); Tianchen Zhao, Bellevue, WA (US); Jonathan Wu, Seattle, WA (US); Joseph P. Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 18/187,208

(22) Filed: Mar. 21, 2023

(51) Int. Cl.
| | |
|---|---|
| H04L 29/06 | (2006.01) |
| G06F 21/32 | (2013.01) |
| G06T 17/20 | (2006.01) |
| G06V 40/16 | (2022.01) |
| G06V 40/40 | (2022.01) |
| H04L 9/40 | (2022.01) |

(52) U.S. Cl.
CPC .......... *H04L 63/0861* (2013.01); *G06F 21/32* (2013.01); *G06T 17/20* (2013.01); *G06V 40/172* (2022.01); *G06V 40/40* (2022.01)

(58) Field of Classification Search
CPC .................................................. H04L 63/0861
See application file for complete search history.

(56) References Cited

U.S. PATENT DOCUMENTS

| | | | | |
|---|---|---|---|---|
| 2016/0048670 | A1* | 2/2016 | Kim ................... | G06V 40/1353 382/125 |
| 2016/0277412 | A1* | 9/2016 | Streuter ............. | G06Q 20/1085 |
| 2020/0351657 | A1* | 11/2020 | Wentz .................. | H04L 9/3231 |
| 2022/0321556 | A1* | 10/2022 | Gandhi ............... | H04W 12/068 |

* cited by examiner

*Primary Examiner* — Bradley W Holder
(74) *Attorney, Agent, or Firm* — Nicholson De Vos Webster & Elliott LLP

(57) ABSTRACT

Systems and techniques are disclosed for authorizing users based on biometric data. Images are collected from an authorized user are used to generate three-dimensional representations of the user that are stored for use in authorization operations. Images accompanying a request for authorization are first processed using liveness detection operations and then, if the images are associated with a live person, a three-dimensional representation of the person is generated using the images. If a correspondence to a verified user's three-dimensional representation is identified for the three-dimensional representation of the person requesting authorization, the request is granted.

20 Claims, 9 Drawing Sheets

MOBILE DEVICE USER AUTHORIZATION SYSTEM

BACKGROUND

The use of mobile devices has grown greatly as the technological capabilities of such devices and the networks that support them have rapidly increased while the associated costs have dropped. Along with the ubiquity of mobile devices have come increased concerns about the security of such devices. Increasingly sophisticated security technologies have also been developed to address these concerns. Rather than a simple access code or password, modern mobile devices may use biometric security systems such as fingerprints or face recognition to authorize a user to access and operate a device. However, even these improved biometric systems are subject to attempts at circumvention by unauthorized and/or unscrupulous users. The efforts of such users can make it challenging for mobile device manufacturers and users to ensure the security of mobile devices and restrict access to such devices from unauthorized users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
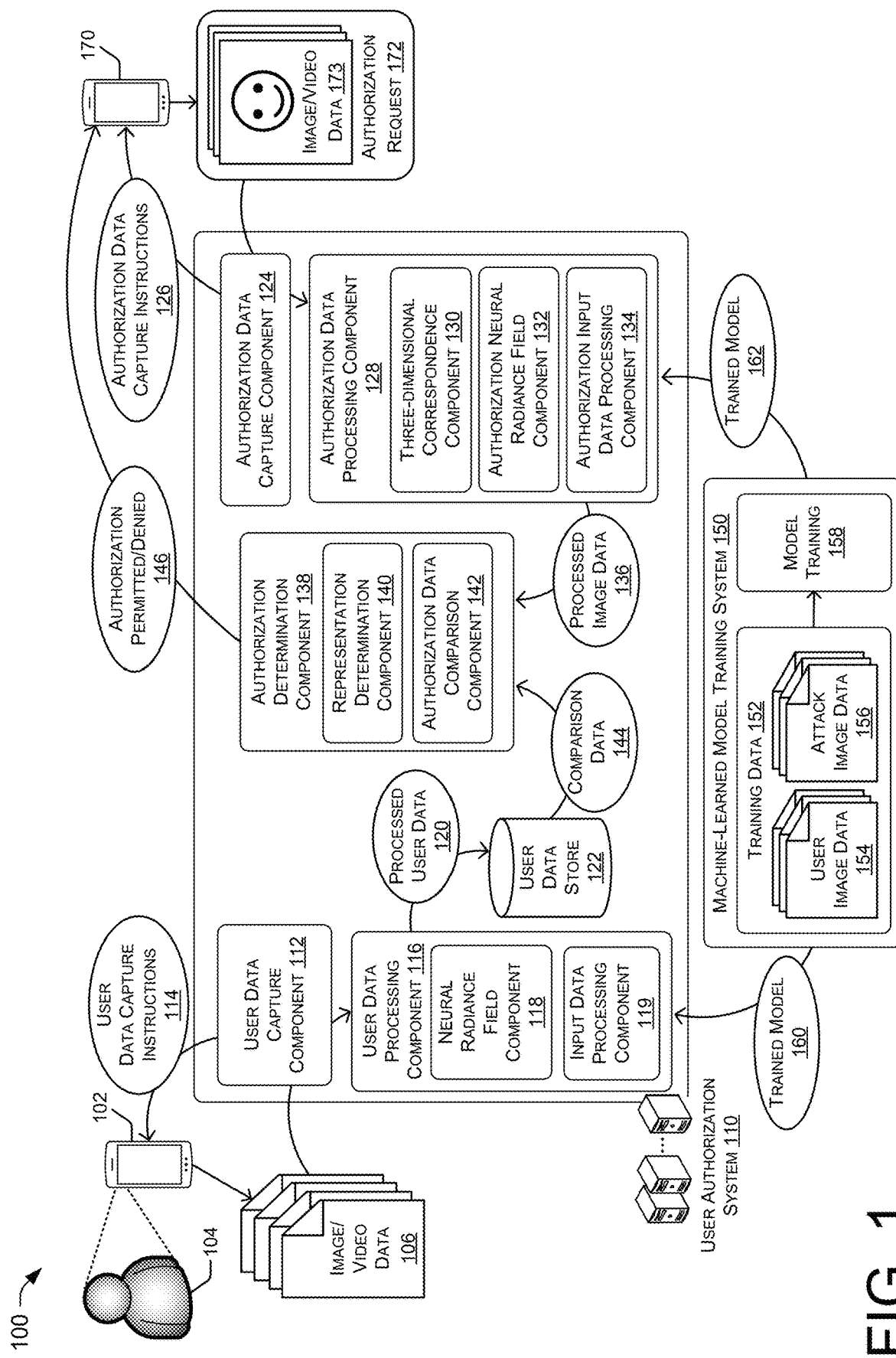
FIG. 1 illustrates a system-architecture diagram of an example environment in which a mobile device user authorization system may be implemented.

A user authorization system may interact with a mobile device to verify that a user attempting to operate the device is authorized to do so. A user authorization system may be configured locally on a mobile device or may be a remote system with which the mobile device communicates. Alternatively, a user authorization system may include one or more components configured on a mobile device and one or more components configured at a remote system. A user authorization system may use data provided by a user that may be attempting to access and/or operate a mobile device to determine whether the user is authorized to do so. A user authorization system may compare data collected from or otherwise associated with a user attempting to operate a device to data associated with one or more known authorized users ("verified users") to determine if the user attempting to operate the device is authorized to do so.

If a user authorization system matches data associated with a user attempting to operate a device to data associated with a verified user, the user authorization system may "unlock" the device or otherwise allow that user to access and/or operate the device. If the user authorization system fails to find data associated with a verified user that corresponds to the data associated with the user attempting to operate the device, the user authorization system may "lock" the device or otherwise not allow the user to access and/or operate the device. In some examples (e.g., after a number of failed authorizations), the user authorization system may lock the device for a period of time and/or until another user (e.g., administrative user) unlocks the device.

Various forms of data may be used to perform user authorization operations. For example, a mobile device may be configured to receive, as input, an alphanumeric code or password that a user authorization system may compare to one or more stored verified user codes or passwords. Alternatively or additionally, a mobile device may be configured to receive or collect, as input, biometric data (e.g., fingerprint, palmprint, facial image, iris image, retina image, etc.) that a user authorization system may compare to stored biometric data associated with one or more verified users. In such systems, the biometric data may be processed to generate data that may be used for such comparisons. For example, fingerprints or facial images may be processed to generate numerical representations or other data representations of such biometric data that may then be compared to numerical representations or other data representations of biometric data associated with one or more verified users.

The difficulty of circumventing user authorization systems may vary depending on the authorization techniques implemented by such systems. For systems that use combinations of alphameric characters as an authorization code, an unscrupulous user may acquire the authorization code by observing a verified user unlocking a device or by simply guessing the code. Circumventing biometric user authorization system may pose greater difficulty. However, an unscrupulous user may still attempt to circumvent such a system using images or other representations biometric features of a verified user. For example, an unauthorized user may use an image of a verified user's face or a replication of a verified user's fingerprint to access a device.

Representations of biometric features used to circumvent an authorization system may be physical and/or virtual. For example, an unauthorized user may use a physical photograph or a digital presentation of an image (e.g., on a display of another device) to attempt to access a device that uses a facial image-based user authorization system. Alternatively, an unauthorized user may insert data representing an image of a verified user's face into a data stream transmitted to a user authentication system to attempt to access a device that uses a facial image-based user authorization system. If a representation of a biometric feature provided by an unscrupulous user is sufficient to generate a representation of such data that corresponds to a representation of biometric data associated with a verified user, the representation of the biometric feature provided by the unscrupulous user may be used to access a device without authorization.

The user authorization systems and techniques described herein may prevent unauthorized access and/or operation of mobile devices by detecting and preventing the use of images of biometric features of a verified user (may be referred to as "presentation attacks") for device access. The disclosed user authorization systems may first verify that an image provided by a user for authorization is an image of a live person using three-dimensional correspondence points to determine whether a face represented in the image has a planar structure of a flat image or a three-dimensional structure of a live person. If the image is determined to be of a live person, the disclosed user authorization systems may then use the image and/or generate a two- or three-dimensional representation of the face in the image and compare that image or representation to one or more two- or three-dimensional representation of faces of verified users. If the disclosed user authorization systems determine a representation of a face of a verified user that corresponds to the representation of the face in the image, the user providing the image may be granted device access. If there is no correspondence determined, the user may be denied device access.

In various examples, the user authorization system may collect and/or generate verified user authorization data for use in subsequent authorization operations. For example, the user authorization system may instruct a verified user or a user's mobile device to capture one or more images of the verified user's face using the mobile device. The images may be captured at one or more specific angles relative to the verified user's face and/or using one or more specific poses. The number of images collected and the angles/poses used may be determined by the user authorization system based on desired resource (e.g., CPU, memory, etc.) and/or performance parameters. In some examples, the user authorization system may randomly select one or more angles or positions to use for images requested and collected. Alternatively or additionally, the user authorization system may instruct a verified user or a user's mobile device to capture video of the user's face from different angles, for example while moving the mobile device about the user's head with the camera pointing at the user's face. The images and/or video collected may include or be accompanied by other data that may be determined by one or more device components and that may be used to determine a device position associated with a particular image or video. For example, the images and/or video may include device position data, sensor data (e.g., associated with inertial sensors (e.g., inertial measurement units, accelerometers, gyros, etc.), global positioning satellite (GPS) sensors, etc.), and/or any other data that may be used to indicate the angle of the device and/or the position of the device relative to the user's face.

For example, the user authorization system may determine that ten images at ten distinct predetermined angles would provide the best balance of quality verified user data and resource utilization. The user authorization system may then instruct the user to operate a camera configured on the user's mobile device to capture these ten images at the ten angles. Alternatively or additionally, the user authorization system may then instruct the user's mobile device to capture these ten images at the ten angles, for example, where the device is configured with a movable and/or controllable camera. The user authorization system may also, or instead, instruct the user's mobile device to capture video from which the user authorization system may then select ten still images from ten specific angles. In examples, the user authorization system may also, or instead, instruct the user's mobile device to present current device position information (e.g., angle) on a device display so that the user may see the current position and move the device to place it in a desired position. The user authorization system may also, or instead, instruct the user's mobile device to present an indication (e.g., audible, on a device display, etc.) when the device is in a desired position so that the user may be notified that the device is in the desired position and may operate the device to capture an image.

The user authorization system may process the image(s) and/or video collected by the verified user's mobile device for use in subsequent authorization operations. In examples, the user authorization system may determine three-dimensional correspondence data (e.g., three-dimensional correspondence points) based on the images and/or video. The user authorization system may also, or instead, determine three-dimensional representation data based on the images and/or video and/or device position data associated with such images and/or video (and/or using the three-dimensional correspondence data). This three-dimensional representation data may include, or may be used to generate, a three-dimensional reconstruction or model of the user's face and/or head. In various examples, a neural radiance field (NeRF) or one or more other neural networks may be trained and executed to generate three-dimensional data output using the images and/or video as input. Alternatively, a machine-learned model may be trained to generate three-dimensional data output and may be executed by a NeRF or one or more other neural networks to generate such three-dimensional data output.

In examples, the user authorization system may prepare the input data for the NeRF or other neural network by generating a face mesh using one or more three-dimensional morphable face models. The user authorization system may further prepare the input data for the NeRF or other neural network by applying depth supervision to the face mesh generated using the morphable face models. The generated face mesh may then be used as input into the NeRF or other neural network to generate the three-dimensional representation data output. The user authorization system may store the determined three-dimensional correspondence data and/or three-dimensional representation data as verified user authorization data and associate such verified user authorization data with the verified user for future use in one or more authorization operations.

The user authorization system may receive (e.g., subsequent to collecting and/or determining verified user authorization data) a request to authorize access to the verified user's mobile device. This request may include or otherwise be associated with one or more images and/or video associated with a user requesting authorization. Alternatively or additionally, in response to receiving such a request, the user authorization system may instruct the requesting user and/or the mobile device to collect one or more images and/or video of the requesting user. Such instructions may include specific angles, poses, and/or positions to be used in capturing such images and/or video of the requesting user.

The user authorization system may perform one or more liveness detection operations on the image(s) and/or video to determine whether the image(s) and/or video are associated with a live person (e.g., as opposed to being image(s) and/or video of another image or video). In examples, the user authorization system may estimate three-dimensional correspondence points for the image(s) and/or video and/or associated camera poses using structure-from-motion techniques. For example, the user authorization system may use linear regression and a "goodness of fit" measurement $R^2$ (also referred to herein as a "fit measurement") for the three-dimensional correspondence points to determine whether the three-dimensional correspondence points $v_{sfm}$ fit more closely to a plane (e.g., associated with an image of an image) or a three-dimensional structure (e.g., associated with an image of a face or portion of a live person). Where $R^2$ may be defined as shown in equation (1) below.

$$R^2 = \frac{\sum(z_i - \hat{z}_i)^2}{\sum(z_i - \bar{z}_i)^2} \quad (1)$$

In equation (1), $\hat{Z}_i$ may result from fitting $z_i = \beta_0 x_i + \beta_1 y_i + \epsilon_i$. $z_i$ may be a "z" dimension parameter that may be generated by a NeRF and/or one or more other neural networks trained or otherwise configured to generate three-dimensional data output. Alternatively or additionally, $z_i$ may be a "z" dimension parameter that may be generated by a machine-learned model trained or otherwise configured to generate three-dimensional data output. In this example, a smaller $R^2$ may indicate a better fit to a plane, and therefore a larger $R^2$ may indicate a better fit to a three-dimensional structure (e.g., a face). In examples, a threshold value T may be used such that an image with $R^2 < T$ may be determined to be associated with an "attack" image or an image of an image (e.g., rather than an image of a live person), whereas an image with $R^2 \geq T$ may be determined to be associated with a live person.

If the user authorization system determines that the image(s) and/or video associated with the request to authorize access to the verified user's mobile device are not associated with a live person, the user authorization system may deny the request for access. The user authorization system may further perform one or more actions to prevent access and/or further attempts to access the mobile device.

If the user authorization system determines that such image(s) and/or video are associated with a live person, the user authorization system may perform one or more user authorization operations to determine if the image(s) and/or video are associated with a verified user. The user authorization system may generate a three-dimensional representation (e.g., reconstruction or model) of the face represented in the image(s) and/or video to use in comparison to verified user data that may also include three-dimensional representation data. In examples, the user authorization system may execute a NeRF or one or more other neural networks to generate this three-dimensional representation data output using the images and/or video as input. In other examples (e.g., where only a single image is provided or otherwise associated with the request to authorize access), the user authorization system may determine, generate, or use two-dimensional representation based on that image (e.g., use the image itself) for authorization operations.

In examples, the user authorization system may prepare the input data for the NeRF or other neural network by generating a face mesh using one or more three-dimensional morphable face models. The user authorization system may further prepare the input data for the NeRF or other neural network by applying depth supervision to the face mesh generated using the morphable face models. The generated face mesh may then be used as input into the NeRF or other neural network to generate the three-dimensional representation data output.

Where the user authorization system has determined a three-dimensional representation based on the access request, the user authorization system may compare the three-dimensional representation determined based on the access request to one or more stored three-dimensional representations associated with one or more respective verified users to determine if any one or more of the verified user three-dimensional representations sufficiently correspond to the three-dimensional representation determined based on the access request. Because the three-dimensional representation data generated by a NeRF may be a complex dataset, it may be unlikely that any two such representations completely match. Therefore, in examples, a threshold correspondence may be used to determine whether a three-dimensional representation determined based on an access request corresponds to verified user three-dimensional representations. In such examples, the user authorization system may determine a percentage of similarity of data between the two representations and compare the percentage of similarity to a threshold. If the percentage meets or exceeds the threshold, the user authorization system may determine that the two representations are associated with the same user, otherwise the user authorization system may determine that they are not. For instance, if the three-dimensional representation determined based on the access request has at least a threshold of similarly (e.g., 75%, 90%, 95%, 99%, 99.5%, 99.9%, etc.) with a particular verified user three-dimensional representation, the user authorization system may determine that the user associated with the access request is the verified user. The user authorization system may then authorize the user for access to the mobile device. The user authorization system may also determine a confidence value for a match determined based on a threshold (e.g., based on how far the similarity exceeds the threshold and/or one or more other factors).

Where the user authorization system has determined a two-dimensional representation based on the access request (e.g., where only one image was provided with the request), the user authorization system may compare the two-dimensional representation determined based on the access request to one or more stored or generated two-dimensional representations associated with one or more respective verified users to determine if any one or more of the verified user two-dimensional representations sufficiently correspond to the two-dimensional representation determined based on the access request. For example, the suer authorization system may determine, based on data associated with the image and/or determined from the image, an angle or position of the device that captured the image associated with the access request. Using this angle or position, the user authorization system may generate a two-dimensional representation of an individual verified user based on the three-dimensional representation data associated with such a user. In examples, the user authorization system may execute a NeRF and/or a machine-learned model to generate such a two-dimensional representation based on three-dimensional representation data. Similar to three-dimensional representation data, the two-dimensional representation data generated by a NeRF may be a complex dataset that may be unlikely to completely match a comparison two-dimensional representation. Therefore, in examples, a threshold correspondence may be used to determine whether a two-dimensional representation determined based on an access request corresponds to verified user two-dimensional representations. In such examples, the user authorization system may determine a percentage of similarity of data between the two representations and compare the percentage of similarity to a threshold. If the percentage meets or exceeds the threshold, the user authorization system may determine that the two representations are associated with the same user, otherwise the user authorization system may determine that they are not. For instance, if the two-dimensional representation determined based on the access request has at least a threshold of similarly (e.g., 75%, 90%, 95%, 99%, 99.5%, 99.9%, etc.) with a particular verified user two-dimensional representation, the user authorization system may determine that the user associated with the access request is the verified user. The user authorization system may then authorize the user for access to the mobile device. The user authorization system may also determine a confidence value for a match determined based on a threshold (e.g., based on how far the similarity exceeds the threshold and/or one or more other factors).

A NeRF as described herein may be trained using training data that includes images of various types, including images of live people and images of images (and/or similar video).

In an example of an implementation of the disclosed user authorization systems and techniques, a verified user may receive instructions from a user authorization system to operate the verified user's mobile device to capture five images from five different mobile device positions (e.g., relative to the user's face). These images may be transmitted to the user authorization system with associated data, such as sensor data or other data determined from the mobile device that the user authorization system may use to determine and/or verify a device position associated with a particular image. The user authorization system may generate three-dimensional representation data using the captured images (e.g., as described herein) and store that data for subsequent use in authorization operations.

Continuing the implementation example, the user authorization system may receive a request from the verified user for authorization to access the verified user's mobile device. This request may include one or more images captured by the device of the user. The user authorization system may determine that the one or more images are associated with a live person (e.g., based on three-dimensional correspondence data determined based on the one or more images) and then determine that the one or more images are associated with the verified user based on a comparison of three-dimensional representation data determined based on the one or more images to the previously generated three-dimensional representation data associated with the verified user. The user authorization system may then authorize the user to access the device.

Again continuing the implementation example, the user authorization system may receive another request from the mobile device user for authorization to access the verified user's mobile device. This request may include one or more images captured by the device of the user; however these one or more images may be images of a picture of the verified user. The user authorization system may determine that the one or more images are not associated with a live person (e.g., based on three-dimensional correspondence data determined based on the one or more images) and deny the request for access to the device.

Continuing again with the implementation example, the user authorization system may receive yet another request from the mobile device user for authorization to access the verified user's mobile device. This request may include one or more images captured by the device of the user; however these one or more images may be images of live person that is not the verified user. The user authorization system may determine that the one or more images are associated with a live person (e.g., based on three-dimensional correspondence data determined based on the one or more images) and then determine that the one or more images are not associated with the verified user (or any verified user) based on a comparison of three-dimensional representation data determined based on the one or more images to the previously generated three-dimensional representation data associated with the verified user. The user authorization system may then deny the request for access to the device.

In a variation of this implementation example, the user authorization system may receive a request from a user for authorization to access the verified user's mobile device that includes a single image. The user authorization system may determine that the image is associated with a live person (e.g., based on three-dimensional correspondence data determined based on the one or more images). The user authorization system may then determine whether the image is associated with a verified user by determining a capture angle or position associated with the image accompanying the access request and using that angle or position data to determine or generate a two-dimensional representation of the verified user based on the three-dimensional representation data for that verified user. The user authorization system may then determine whether the two-dimensional representation of the verified user sufficiently corresponds to the image accompanying the access request. If so, the user authorization system may authorize the user to access the device. Otherwise the user authorization system may deny access to the device.

The disclosed systems and techniques provide a more efficient and accurate means of detecting attack images and determining authorized users for mobile devices and other systems that may use biometric data for user authorization. By improving the detection of images and/or video submitted as authorization data that does not represent verified users, the security of mobile devices and other systems may be maintained and improved. For example, in current implementations an image of a picture of a person's face may be used to gain access to that person's mobile device, placing the person and their associated personal information at risk, as well as risking the unauthorized use of the device. In the disclosed systems, presentation attacks are more efficiently and accurately detected, thereby preventing unauthorized access to user devices and the issues that may be associated with such access.

The techniques and systems described herein may be implemented in a number of ways. Example implementations and additional details are provided below with reference to the following figures.

FIG. 1 is a block diagram of an illustrative environment 100 that may be a portion of, or otherwise associated with, a user authorization system or any other type of data processing and/or storage system that may perform one or more of the operations described herein. The environment 100 may include user mobile devices 102 and 170, a user authorization system 110, and a machine-learned model training system 150. The systems 110 and 150 may each represent one or more physical and/or logical resources, such as one or more server computers, virtual machines, software resources, databases, notebooks clusters, datasets, etc., or any combination thereof. The mobile devices 102 and 170 may each represent one or more user devices, such as one or more mobile telephones, smartphones, tablet computers, laptop computers, personal computers, smart televisions, etc., or any combination thereof.

The user authorization system 110 may be configured with one or more components and may perform any of the operations as described herein to implement various user authorization operations. In various examples, the user authorization system 110 may include a user data capture component 112 that may be configured to interact with a verified user's device to acquire data that may be used to authorize the verified user. For example, the user data capture component may generate and transmit user data capture instructions 114 to a mobile device 102 that may be associated with a verified user 104. The instruction 114 may include instructions for the user 104 and/or for the device 102 to capture a number of images and/or video. The instructions 114 may further include one or more angles, poses, and/or positions that may be associated with the requested images. The instructions 114 may further include instructions to capture and provide data that may be associated with such images, such as device position data, sensor data (e.g., associated with inertial sensors (e.g., inertial measurement units, accelerometers, gyros, etc.), GPS sensors, etc.), and/or any other data that the user authorization system 110 may use to determine a position of the mobile device 102 when an image was captured. For example, the instructions 114 may instruct the user 104 to capture five images while operating the device 102 at five distinct positions relative to the user 104's face, and to provide these images with position data collected from one or more sensors configured at the mobile device 102.

In response to these instructions, the user 104 may operate the device to capture one or more images and/or video and associated data and provide this data as image/video data 106 to the user data capture component 112. The user data capture component 112 may receive the image/video data 106 from the mobile device 102 and provide the data 106 to a user data processing component 116. The user data processing component 116 may perform one or more operations to process the image(s) and/or video and/or to generate verified user data that may be used in authorization operations to authorize the verified user 104 and/or to deny access to unauthorized users.

In examples, the user data processing component 116 may include a NeRF component 118 that may determine three-dimensional representation data based on the images and/or video in data 106 and/or other data (e.g., device position data) associated with such images/video. This three-dimensional representation data may include, or may be used to generate, a three-dimensional reconstruction or model of the user 104's face and/or head. In examples, an input data processing component 119 of the user data processing component 116 may preprocess the data 106 for the NeRF component 118 by generating a face mesh using one or more three-dimensional morphable face models. The input data processing component 119 may also, or instead, preprocess the data 106 for the NeRF component 118 by applying depth supervision (e.g., to the face mesh generated using the morphable face models). The generated face mesh may then be used as input into the NeRF component 118 to generate the three-dimensional representation data output. The input data processing component 119 may also, or instead, determine three-dimensional correspondence data (e.g., three-dimensional correspondence points) based on the images and/or video of the data 106. The three-dimensional representation data and/or three-dimensional correspondence data generated by these components may be stored as processed user data 120 in a user data store 122 for subsequent retrieval and use in authorization operations. In examples, the processed user data 120 may also include other data that may be used to associate the representation data and/or correspondence data included in the processed user data 120 with the verified user 104.

The NeRF component 118 that may also, or instead, determine two-dimensional representations of verified users based on three-dimensional representation data associated with such users. Such two-dimensional representation data may be determined, for example, based on an angle or position determined for an image associated with an authorization request and the three-dimensional data associated with a verified user. For example, the NeRF component 118 (and/or a machine-learned model executing thereon and/or on one or more other neural networks) may receive an angle or other position data and three-dimensional representation data for a verified user as input and may provide, as output of execution, a two-dimensional representation of the verified user associated with the angle or other position data (e.g., representing an image of the verified user taken from a camera angle and/or position represented by the angle or other position data). This two-dimensional representation of the verified user may be used for authorization operations as described herein.

The user authorization system 110 may also include an authorization data capture component 124. In some examples, this may be a same component as the user data capture component 112, while in other examples this may be a distinct component. In examples, the authorization data capture component 124 may receive an authorization request 172 from a mobile device 170 that may include image/video data 173 that may be provided by a user requesting authorization, for example, for access to the device 170. In other examples, the authorization request 172 may not include image and/or video data that may be used to authorize a user, and the authorization data capture component 124 may, in response to receiving such a request, transmit authorization data capture instructions 126 to the mobile device 170. The instructions 126 may include instructions for the user of the device 170 or for the device 170 to capture a number of images and/or video. As with instructions 114, the instructions 126 may further include one or more angles, poses, and/or positions that may be associated with the requested images and a request to capture and provide data that may be associated with such images, such a device position data, sensor data (e.g., associated with inertial sensors (e.g., inertial measurement units, accelerometers, gyros, etc.), GPS sensors, etc.), and/or any other data that the user authorization system 110 may use to determine a position of the mobile device 170 when an image was captured. For example, the instructions 126 may instruct a user and/or the device 170 to capture three images while operating the device 170 at three distinct positions relative to the user's face, and to provide these images with position data collected from one or more sensors configured at the mobile device 170. The image/video data 173 may be the resulting data captured by the device 170 in response to the instructions 126.

The authorization data capture component 124 may provide the image/video data 173 to an authorization data processing component 128 configured at the user authorization system. The authorization data processing component 128 may perform one or more operations to process the image(s) and/or video in the data 173 and to determine whether the data 173 represents a live person and, if so, generate and provide data to an authorization determination component 138 to determine whether the represented person is authorized.

The authorization data processing component 128 may include a three-dimensional correspondence component 130 that may user authorization system may perform one or more liveness detection operations on the data 173 to determine whether the represents a live person. In examples, the three-dimensional correspondence component 130 may estimate three-dimensional correspondence points for the image(s) and/or video and/or associated camera poses represented in the data 173 using structure-from-motion techniques. For example, the three-dimensional correspondence component 130 may use a "goodness of fit" measurement ($R^2$) and linear regression to determine whether the three-dimensional correspondence points based on the data 173 fit more closely to a plane (e.g., associated with an image of an image) or a three-dimensional structure (e.g., associated with an image of a face). In examples, as described herein, the three-dimensional correspondence component 130 may compare the determined goodness of fit measurement to a threshold to determine if the data 173 represents a live person. If not, the user authorization system 110 may deny access to the device 170 for the user associated with the authorization request 172.

If the three-dimensional correspondence component 130 determines that the data 173 is associated with a live person, the data 173 (and/or the three-dimensional correspondence data based thereon) may be provided to an authorization NeRF component 132. In examples, the authorization NeRF component 132 may determine three-dimensional representation data based on the images and/or video in data 173 and/or other data (e.g., device position data, tree-dimensional correspondence data, etc.) associated with such images/video. This three-dimensional representation data may include, or may be used to generate, a three-dimensional reconstruction or model of a user's face and/or head.

In examples, the authorization data processing component 128 and/or one or more components configured therein (e.g., the authorization NeRF component 132 and/or the authorization input data processing component 134) may determine an angle and/or other position data associated with the images and/or video in data 173. For example, when there is a single image available in the images and/or video in data 173, the authorization data processing component 128 may determine, using the data 173, one or more camera angles and/or positions associated with the single image for use in determining two-dimensional representations of verified users for authorization operations.

In examples, an authorization input data processing component 134 of the authorization data processing component 128 may preprocess the data 173 for the authorization NeRF component 132 by generating a face mesh using one or more three-dimensional morphable face models. The authorization input data processing component 134 may also, or instead, preprocess the data 173 for the authorization NeRF component 132 by applying depth supervision (e.g., to the face mesh generated using the morphable face models). The generated face mesh may then be used as input into the authorization NeRF component 132 to generate the three-dimensional representation data output. The three-dimensional representation data, three-dimensional correspondence data, image angle and/or other position data, and/or any associated data generated by the components of the authorization data processing component 128 may be provided as processed image data 136 to the authorization determination component 138 to determine whether the person represented in the data 173 is an authorized user. The processed image data 136 may include, or may be part of, a request to perform this authorization operation.

The authorization determination component 138 may use the processed image data 136 to perform one or more authorization operations to determine if the person represented in such data corresponds to a verified user. In examples, the processed image data 136 may include one or more three-dimensional reconstructions of a person (e.g., generated by the authorization NeRF component 132) that the authorization determination component 138 may use to perform this authorization determination. Alternatively or additionally, the processed image data 136 may include one or more two-dimensional representations or images of a person, in examples accompanies by associated angle or other position data, that the authorization determination component 138 may use to perform this authorization determination. Alternatively or additionally, the authorization determination component 138 may include a representation determination component 140 that may generate one or more two- or three-dimensional representations based on the data 136 received from the authorization data processing component 128. The authorization data processing component 128 may retrieve comparison data 144 from the user data store for use in the authorization operation(s). The data 144 may include one or more three-dimensional reconstructions of one or more verified users and/or may be used to generate one or more three-dimensional reconstructions of one or more verified users (e.g., by the three-dimensional reconstruction component 140). In examples, the representation determination component 140 may generate or determine one or more two-dimensional representations based on three-dimensional representation data in the comparison data 144 retrieved from the user data store 122.

The authorization determination component 138 may include an authorization data comparison component 142 that determines whether a two- or three-dimensional representation determined based on, or associated with, the processed image data 136 corresponds to one or one or more two- or three-dimensional representations of one or more verified users determined based on or associated with the comparison data 144. In examples, the authorization data comparison component 142 may determine a percentage of similarity of data between the two representations and compare the percentage of similarity to a threshold. If the similarity percentage meets or exceeds the threshold, the authorization data comparison component 142 may determine that the two representations are associated with the same user. Otherwise, the authorization data comparison component 142 may determine that they are not. Based on this determination, the authorization determination component 138 may transmit an authorization permitted/denied message 146 to the mobile device 170 authorizing or denying access to the mobile device 170.

Note that the authorization data comparison component 142 may also, or instead, use other data to perform the described comparisons. For example, the authorization data comparison component 142 may use two-dimensional representation data, two-dimensional reconstruction data, three-dimensional representation data, three-dimensional reconstruction data, three-dimensional correspondence data, and/or any combination thereof, to determine whether a user represented in data associated with a request for device access is authorized. The authorization data comparison component 142 may also determine a confidence value for a correspondence (e.g., determined based on a threshold, how far the similarity exceeds the threshold or falls below the threshold, etc.).

The environment 100 may further include a machine-learned model training system 150 that may train machine-learned models that are executed by the user authorization system 110, for example, by the NeRF components 118 and 132 and/or any other neural networks that may execute models or otherwise be operated by one or more components of the user authorization system 110. The machine-learned model training system 150 may provide training data 152 to a model training component 158 that may train a model of use in the user authorization system 110. The training data 152 may include user image data 154 that may be one or more images and/or video of live person users. The training data 152 may also, or instead, include attack image data 156 that may be one or more images and/or video of non-live representations, such as images of images, images of planar representations of users, etc. Training data 152 may include any one or more of two-dimensional representation data, three-dimensional representation data, image angle data, camera angle data camera position data, etc.

The machine-learned model training system 150 may provide trained models to one or more neural networks configured at the user authorization system 110 for execution. For example, the machine-learned model training system 150 may provide a trained model 160 to the NeRF component 118 of the user data processing component 116 for use in generating verified user three-dimensional representation data. Similarly, the machine-learned model training system 150 may provide a trained model 162 to the authorization NeRF component 132 of the authorization data processing component 128 for use in generating authorization-requesting user three-dimensional representation data. In examples, the machine-learned model training system 150 may also, or instead, provide a trained model one or more other components, such as to the authorization determination component 138 for use in generating two-dimensional representation data based verified user three-dimensional representation data.

As will be appreciated, by providing a more accurate means of detecting unauthorized device access attempts, mobile devices and other devices interoperating with the user authorization systems described herein may be more effectively secured and the risk of unauthorized access to such devices may be reduced. The systems and methods described herein may be faster, more efficient, and more robust than conventional systems and methods, as they may perform authorization operations at higher-powered remote systems, offloading processing and memory-intensive biometric authorization operations from mobile devices with lesser capabilities. Such remote systems may be more robust with redundant capabilities and more secure as physical access to such systems may be much more limited than physical access to a mobile device. Network and digital security may also be superior in such remote systems as compared to mobile devices. That is, the systems and methods described herein provide a technological improvement over existing biometric authorization techniques for authorizing users on devices of any kind, increasing the speed and efficiency of authorizing users while freeing up resources at mobile devices and other local devices that may use the disclose user authorization systems for authorizing users.

FIGS. 2-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
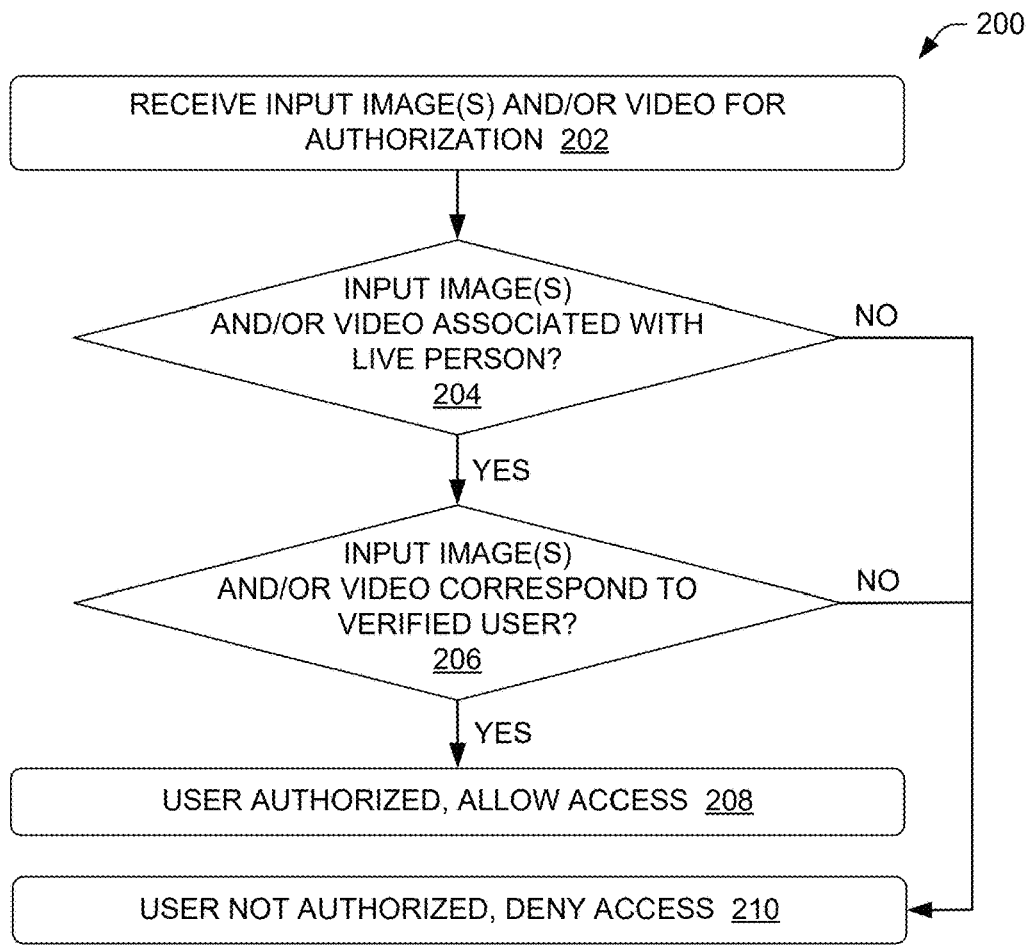
FIG. 2 illustrates a flow diagram of an example method for determining whether a user is authorized in a mobile device user authorization system.

FIG. 2 is a flow diagram of an illustrative process 200 to determine whether input images and/or video are associated with a verified user and to allow or deny access (e.g., to a mobile device) based on that determination. The process 200 may be described at times with reference to the environment 100 and may be performed by the user authorization system 110, and in some examples by one or more of the authorization data capture component 124, the authorization data processing component 128 and/or the authorization determination component 138 of the user authorization system 110, but the process 200 may also, or instead, be performed in other similar and/or different environments by other similar and/or different systems.

At 202, image and/or video data may be received at a user authorization system. For example, the system may receive a request for authorization that includes image and/or video data. Alternatively, the system may receive a request for authorization that does not include image and/or video data and may, in response, request such image and/or video data from the device and/or user originating the received request. The system may subsequently, at 202, receive responsive image and/or video data.

At 204, the user authorization system may determine whether the image and/or video data received at 202 is (e.g., likely) associated with a live person. For example, as described in more detail herein, the system may perform one or more liveness detection operations on the image and/or video data received at 202. If the system determines that the image and/or video data received at 202 is not (e.g., likely) associated with a live person, the process 200 may move to 210, where the system determines that the image and/or video data received at 202 is not associated with an authorized user and may deny the requested authorization (e.g., for device access and/or operation).

If, at 204, the system determines that the image and/or video data received at 202 is (e.g., likely) associated with a live person, at 206 the system may determine whether the person represented in the image and/or video data received at 202 corresponds to an authorized or verified user. For example, as described in more detail herein, the system may perform one or more three-dimensional representation or reconstruction generation operations using the image and/or video data received at 202. The system may also, or instead, perform one or more two-dimensional representation or reconstruction generation operations using the image and/or video data received at 202. The system may then compare the resultant representation(s) or reconstruction(s) to those associated with known verified or authorized users to determine if they correspond to one or more such verified or authorized users. If there are no correspondences determined, the process 200 may move to 210, where the system determines that the image and/or video data received at 202 is not associated with an authorized user and may deny the requested authorization (e.g., for device access and/or operation). If one or more correspondences are determined between the representation(s) or reconstruction(s) based on the image and/or video data received at 202 and those associated with known verified or authorized users, at 208 the system may determine that the image and/or video data received at 202 is associated with an authorized user and may permit or otherwise facilitate the requested authorization (e.g., for device access and/or operation).

Figure 3:
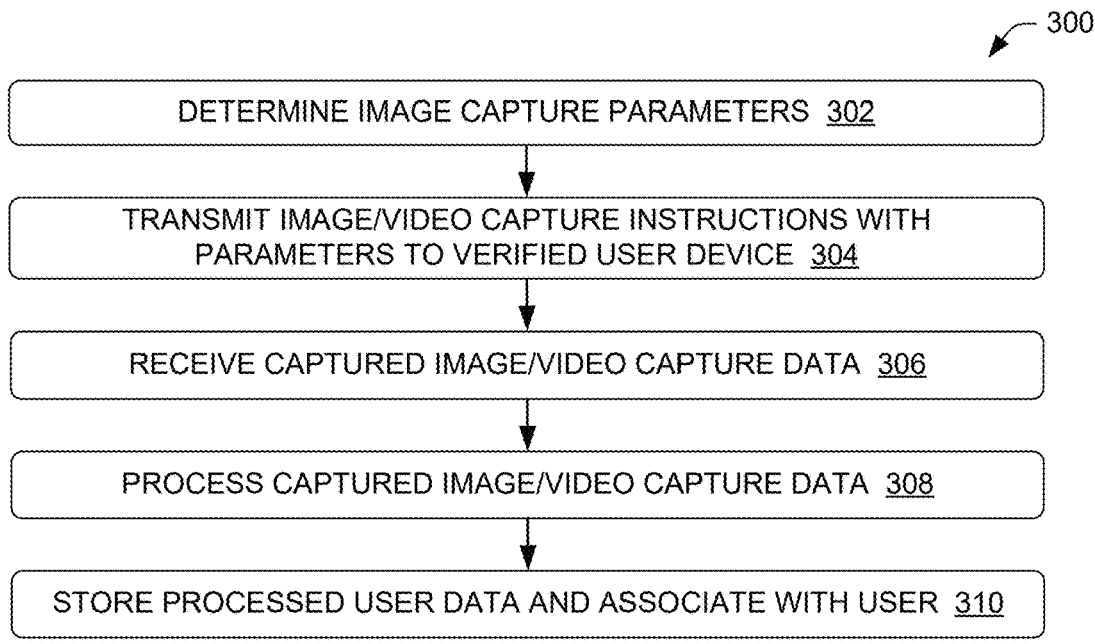
FIG. 3 illustrates a flow diagram of an example method for collecting and processing verified user data in a mobile device user authorization system.

FIG. 3 is a flow diagram of an illustrative process 300 to capture and generate data associated with a verified user that may subsequently be used to allow or deny access (e.g., to a mobile device) based on such data. The process 300 may be described at times with reference to the environment 100 and may be performed by the user authorization system 110, and in some examples by one or more of the user data capture component 112, the user data processing component 116 and/or the user data store 122 of the user authorization system 110, but the process 300 may also, or instead, be performed in other similar and/or different environments by other similar and/or different systems.

At 302, a user authorization system may determine one or more parameters for images and/or video that may be captured and processed to determine verified user data that may then be used in authorization operations (e.g., as described herein). In examples, the user authorization system may determine parameters that may include a number of images to be acquired; a time length of video to be captured; one or more angles, poses, and/or positions associated with such images to be acquired; a path of camera movement for a video capture; data to be acquired and associated with such images and/or video, such as device position data, sensor data (e.g., associated with inertial sensors (e.g., inertial measurement units, accelerometers, gyros, etc.), GPS sensors, etc.), time of capture data, and/or any other data that may be associated with an image or video; and/or any other parameters that may be associated with capturing image and/or video data.

At 304, the system may transmit instructions with the parameters to a verified user's device (e.g., mobile device). The instructions may be presented to the user on the device instructing the user to operate the device to capture the images and/or video (and/or associated data) as indicated by the parameters. Alternatively, the instructions may instruct the device itself to perform one or more actions to acquire the requested images and/or video and associated data.

At 306, the user authorization system may receive the captured image and/or video data from the verified user's device. The user authorization system may store this data for future retrieval and/or for processing by one or more other components.

At 308, the user authorization system may process the received image and/or video data to generate verified user data that may subsequently be used in authorization operations as described herein. For example, as described in more detail herein, the user authorization system may determine three-dimensional correspondence data (e.g., three-dimensional correspondence points) based on the image and/or video data received at 306 and/or three-dimensional representation data based on the image and/or video data received at 306. As noted herein, such three-dimensional representation data may include, or may be used to generate, a three-dimensional reconstruction or model of the verified user's face and/or head. In various examples, a NeRF or one or more other neural networks may be trained and executed to generate three-dimensional representation data output using the image and/or video data received at 306. The image and/or video data received at 306 may be preprocessed to generate input data (e.g., one or more face meshes) for a NeRF or one or more other neural networks (or a machine-learned model executing thereon) using three-dimensional morphable face models and/or depth supervision as described herein.

At 310, the user authorization system may store the three-dimensional representation data generated at 308 in a verified user data store and associate such data with the verified user (e.g., with an identifier associated with the verified user). This verified user data may then be used to perform authorization operations as described herein.

Figure 4:
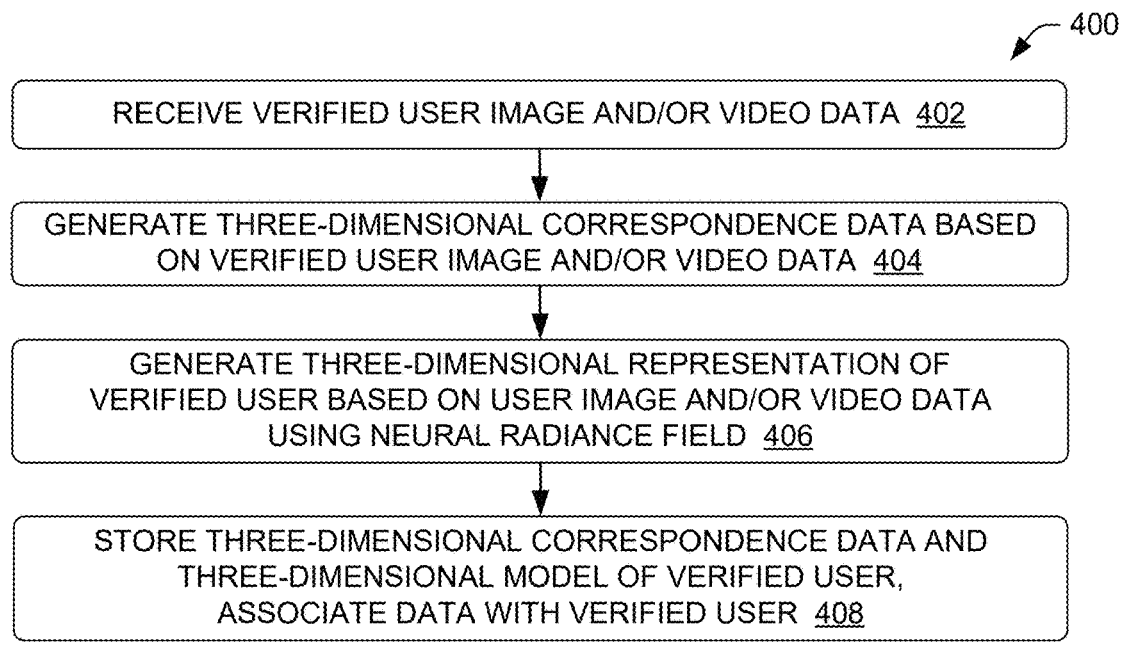
FIG. 4 illustrates a flow diagram of an example method for processing verified user data in a mobile device user authorization system.

FIG. 4 is a flow diagram of an illustrative process 400 of processing data associated with a verified user so that such data may subsequently be used to allow or deny access (e.g., to a mobile device) based on such data. The process 400 may be described at times with reference to the environment 100 and may be performed by the user authorization system 110, and in some examples by one or more of the user data processing component 116 and/or the user data store 122 of the user authorization system 110, but the process 400 may also, or instead, be performed in other similar and/or different environments by other similar and/or different systems.

At 402, image and/or video data associated with a verified user may be received or obtained. For example, the image and/or video data received at 402 may be data requested by the user authorization system and may include, in addition to images and/or video, device position data (angles, poses, and/or positions associated with images; path of camera movement for a video; device position data, sensor data; etc.).

At 404, the user authorization system may generate three-dimensional correspondence data (e.g., three-dimensional correspondence points) based on the images and/or video. The user authorization system may determine the data using structure-from-motion techniques and/or any other three-dimensional correspondence data and/or three-dimensional correspondence point determination operations.

At 406, the user authorization system may generate one or more three-dimensional representations (e.g., reconstructions) of the verified user based on the image and/or video data received at 402 (and/or using the three-dimensional correspondence data determined at 404). This three-dimensional representation data may include, or may be used to generate, a three-dimensional reconstruction or model of the verified user's face and/or head.

As described herein, in various examples, a NeRF or one or more other neural networks may be trained and executed, or may execute a trained machine-learned model, to generate three-dimensional representation data output using the images and/or video as input. In examples, the user authorization system may prepare input data for the NeRF/neural network/machine-learned model by generating a face mesh based on the image and/or video data received at 402 using one or more three-dimensional morphable face models. The user authorization system may also prepare the input data for the NeRF/neural network/machine-learned model by applying depth supervision to the face mesh generated using the morphable face model(s). This generated face mesh may then be used as input into the NeRF/neural network/machine-learned model to generate the three-dimensional representation data as output.

At 408, the user authorization system may store the determined three-dimensional correspondence data and/or three-dimensional representation data as verified user authorization data and associate such verified user authorization data with the verified user for use in one or more authorization operations.

Figure 5:
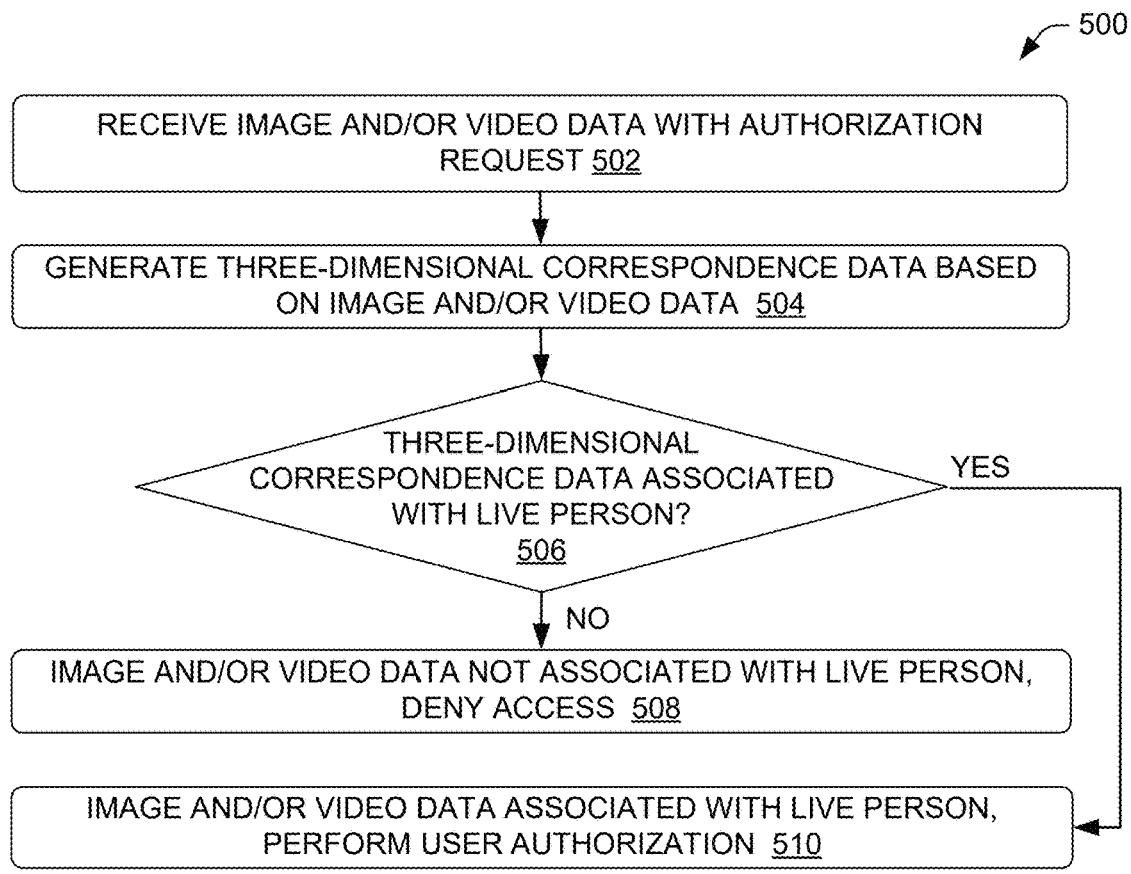
FIG. 5 illustrates a flow diagram of an example method for determining whether image and/or video data is associated with a live person in a mobile device user authorization system.

FIG. 5 is a flow diagram of an illustrative process 500 of processing data received or associated with a request for authorization to determine if the data is associated with a live person (liveness detection). The process 500 may be described at times with reference to the environment 100 and may be performed by the user authorization system 110, and in some examples by one or more of the authorization data processing component 128, but the process 500 may also, or instead, be performed in other similar and/or different environments by other similar and/or different systems.

At 502, image and/or video data may be received at a user authorization system. For example, the system may receive a request for authorization that includes image and/or video data. Alternatively, the system may receive a request for authorization that does not include image and/or video data and may, in response, request such image and/or video data from the device and/or user originating the received request. The system may subsequently, at 502, receive responsive image and/or video data.

At 504, the user authorization system may generate three-dimensional correspondence data based on the image and/or video data received at 502. In examples, the user authorization system may estimate three-dimensional correspondence points for the image(s) and/or video and/or associated camera poses using structure-from-motion techniques. Other operations may also, or instead, be used to determine three-dimensional correspondence data. The user authorization system may also, at 504, use linear regression and determine a "goodness of fit" measurement $R^2$ (defined above) for the three-dimensional correspondence points.

At 506, the user authorization system may use the three-dimensional correspondence data (e.g., three-dimensional correspondence points and/or $R^2$) to determine if the image and/or video data received at 502 (e.g., likely) corresponds to a live person. For example, the user authorization system may determine whether the three-dimensional correspondence points fit more closely to a plane (e.g., associated with an image of an image) or a three-dimensional structure (e.g., associated with an image of a face). In examples, the user authorization system may make this determination based on comparing the "goodness of fit" measurement $R^2$ to a threshold. If this measurement meets or exceeds such a threshold, the user authorization system may determine that the image and/or video data received at 502 is associated with a live person, otherwise the system may determine that the image and/or video data is not associated with a live person.

If, at 506, the user authorization system determines that the image and/or video data is (e.g., likely) not associated with a live person, at 508 the user authorization system may deny the request for access. The user authorization system may further perform one or more actions at 508 to prevent access and/or further attempts to access the mobile device.

If, at 506, the user authorization system determines that the image and/or video data is (e.g., likely) associated with a live person, at 510 the user authorization system may perform one or more user authorization operations (e.g., using the image and/or video data received at 502) as described herein.

Figure 6:
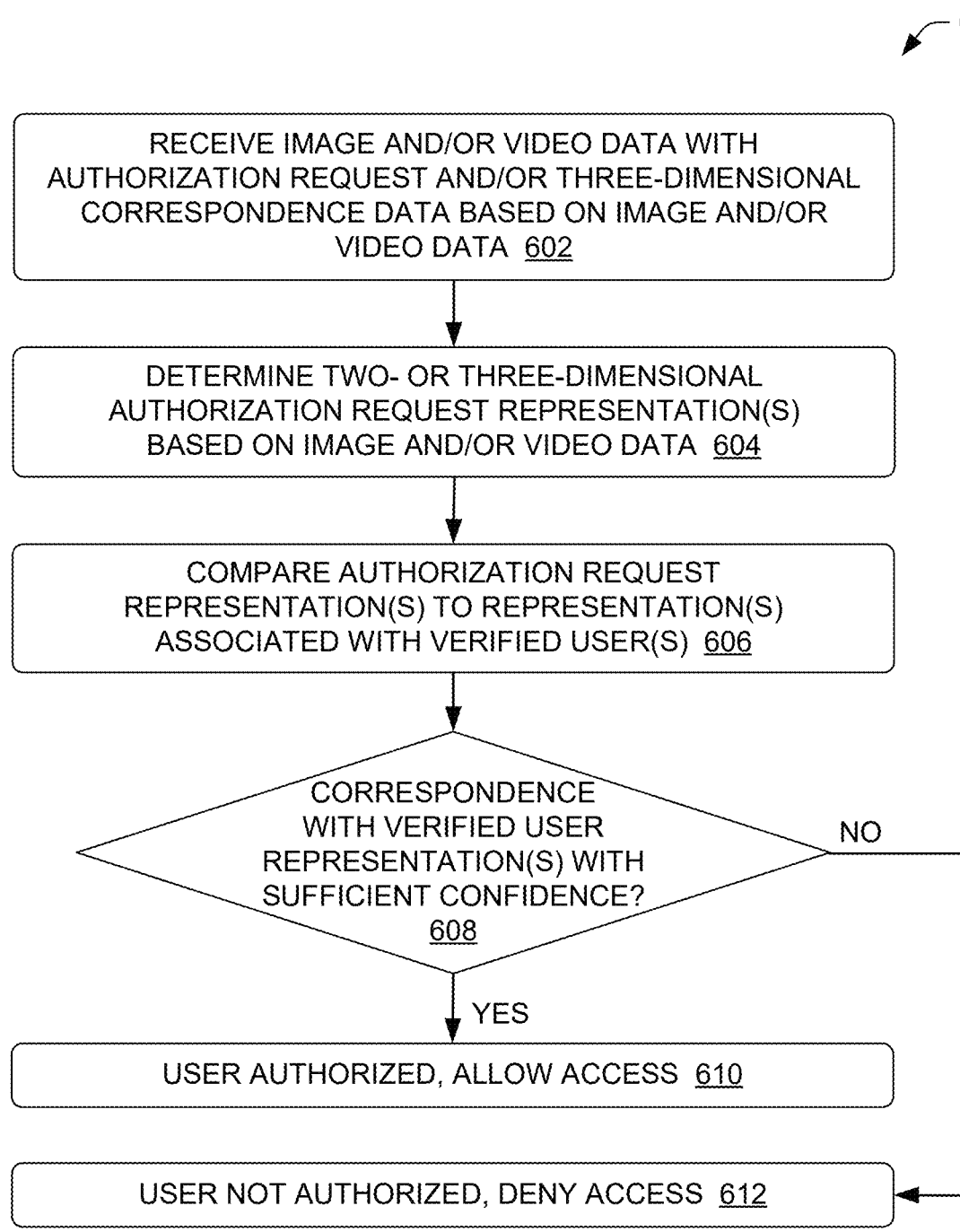
FIG. 6 illustrates a flow diagram of an example method for determining whether image and/or video data is associated with a verified user in a mobile device user authorization system.

FIG. 6 is a flow diagram of an illustrative process 600 of performing user authorization operations using data received or associated with a request for authorization to determine if the user is authorized. The process 600 may be described at times with reference to the environment 100 and may be performed by the user authorization system 110, and in some examples by one or more of the authorization data processing component 128, but the process 600 may also, or instead, be performed in other similar and/or different environments by other similar and/or different systems.

At 602, image and/or video data may be received at a user authorization system. For example, the system may receive a request for authorization that includes image and/or video data. Alternatively, the system may receive a request for authorization that does not include image and/or video data and may, in response, request such image and/or video data from the device and/or user originating the received request. The system may subsequently, at 602, receive responsive image and/or video data. The image and/or video data received at 602 may be transmitted from a component that performed one or more liveness detection operations as described herein to determine that the image and/or video data is associated with a live person. As part of such liveness detection operations, such a component may have determined or generated three-dimensional correspondence data that may also be received at 602. In other examples, the image and/or video data received at 602 may include unprocessed data received with a request for authorization.

At operation 604, the user authorization system may generate one or more two- or three-dimensional representations (e.g., reconstructions) of a user based on the image and/or video data received at 602 (and/or using the three-dimensional correspondence data received at 602). This representation data may include, or may be used to generate, a three-dimensional reconstruction or model of the verified user's face and/or head. As described herein, a NeRF or one or more other neural networks may be trained and executed, or may execute a trained machine-learned model, to generate three-dimensional representation data output using the images and/or video as input. In examples, the user authorization system may prepare input data for the NeRF/neural network/machine-learned model by generating a face mesh based on the image and/or video data received at 602 using one or more three-dimensional morphable face models. The user authorization system may also prepare the input data for the NeRF/neural network/machine-learned model by applying depth supervision to the face mesh generated using the morphable face model(s). This generated face mesh may then be used as input into the NeRF/neural network/machine-learned model to generate the three-dimensional representation data as output.

Alternatively, the image and/or video data received at 602 may be used to generate a two-dimensional representation of the verified user's face and/or head. For example, the image and/or video data received at 602 may include or otherwise be associated with a single image that may be used for authorization operations. At 604, the system may determine this image and, in examples, angle and/or other position data that may be associated with such an image. For example, angle and/or other position data may accompany the image and may have been included with the image by the device transmitting the authorization request or otherwise capture and/or providing the image. Alternatively or additionally, at

604, the user authorization system (e.g., a NeRF and/or machine-learned model) may determine angle and/or other position data for an image associated with the image and/or video data received at 602.

At 606, the user authorization system may compare the two- or three-dimensional representation data determined at 604 to two- or three-dimensional representation data associated with one or more verified users. In examples, the user authorization system may determine a percentage of similarity of the three-dimensional representation data determined at 604 and three-dimensional representation data associated with individual verified users. The user authorization system may then compare the percentage of similarity to individual verified user three-dimensional representation data to a threshold. If the similarity percentage meets or exceeds the threshold for a particular verified user, the user authorization system may determine that the image and/or video data received at 602 corresponds to that user. Otherwise the user authorization system may determine that it does not. If the user authorization system exhausts the available or applicable verified user three-dimensional representation data without finding a sufficient correspondence, the user authorization system may determine that the person represented in the image and/or video data received at 602 is not an authorized user.

In other examples, the user authorization system may determine a percentage of similarity of the two-dimensional representation data determined at 604 and two-dimensional representation data associated with individual verified users. For example, the user authorization system may determine three-dimensional representation data associated with verified users and generates or otherwise determine two-dimensional representation data for such users based on the three-dimensional representation data and angle and/or other position data associated with the two-dimensional representation data determined at 604. In examples, this generation of two-dimensional representation data for verified users based on the three-dimensional representation data and angle and/or other position data may be implemented using a NeRF and/or machine-learned model. The user authorization system may then compare the percentage of similarity of the two-dimensional representation data determined at 604 to individual verified user two-dimensional representation data to a threshold. If the similarity percentage meets or exceeds the threshold for a particular verified user, the user authorization system may determine that the image and/or video data received at 602 corresponds to that user. Otherwise the user authorization system may determine that it does not. If the user authorization system exhausts the available or applicable verified user two-dimensional representation data without finding a sufficient correspondence, the user authorization system may determine that the person represented in the image and/or video data received at 602 is not an authorized user.

If, at 608, the user authorization system does not determine a correspondence between the person represented in the image and/or video data received at 602 and a verified user (e.g., based on comparisons of two- or three-dimensional representation data), the process 600 may proceed to 612 and the user authorization system may deny the request for access. The user authorization system may further perform one or more actions to prevent access and/or further attempts to access the mobile device.

If, at 608, the user authorization system determines at least one correspondence between the person represented in the image and/or video data received at 602 and a verified user (e.g., based on comparisons of two- or three-dimensional representation data), the process 600 may proceed to 610 and the user authorization system may permit or otherwise facilitate the requested authorization (e.g., for device access and/or operation).

Figure 7:
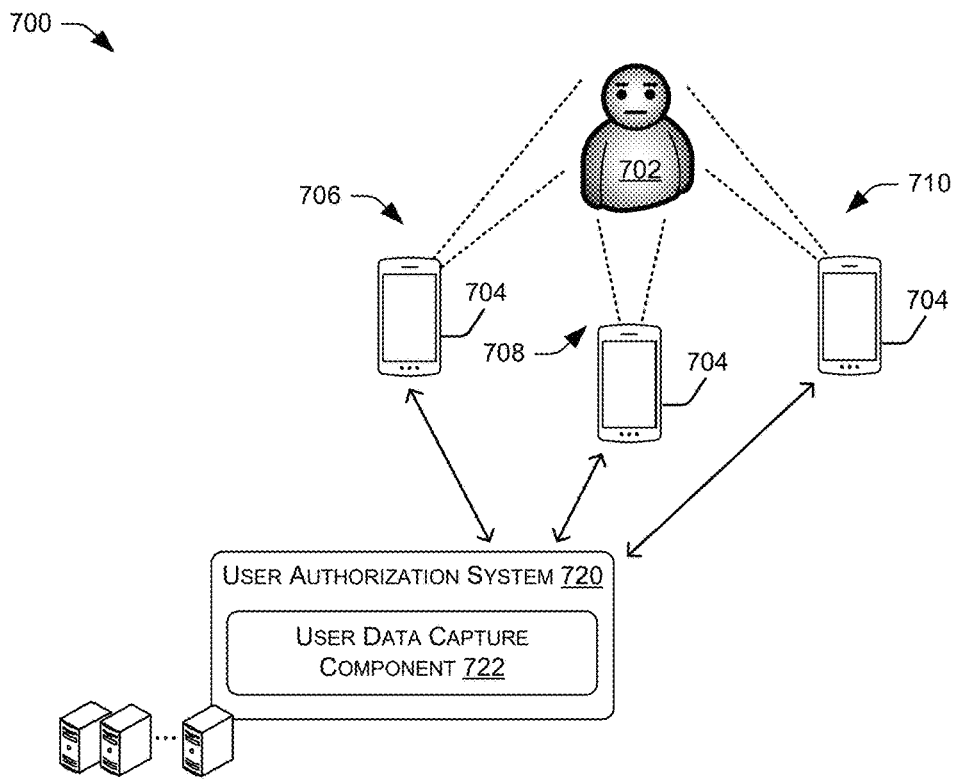
FIG. 7 illustrates an example environment including a user device and a user authorization system as disclosed herein.

FIG. 7 illustrates an example environment 700 that may include a verified user's mobile device 704 and a user authorization system 720. The device 704 may be any type of user device as described herein or any other type of user device. The user authorization system 720 may be any user authorization system as described herein (e.g., user authorization system 110) or any other user authorization system and may represent one or more physical and/or logical resources, such as one or more server computers, virtual machines, software resources, databases, notebooks clusters, datasets, etc., or any combination thereof. The user authorization system 720 may include a user data capture component 722 that may be similar to a user data capture component as described herein and/or may perform operations similar to those performed by user data capture components described herein (e.g., user data capture component 112).

A verified user 702 may be operating mobile device 704. The user authorization system 720 (e.g., the user data capture component 722) may be configured to obtain verified user data that may then be used in authorization operations (e.g., as described herein) from the verified user 702 via the mobile device 704. The user data capture component 722 may determine one or more parameters for the images and/or video that may be captured and processed to determine the verified user data. The user data capture component 722 may transmit instructions to the mobile device 704 to instruct the user 702 and/or the device 704 to capture data based on such parameters.

For example, the user data capture component 722 may instruct the user 702 and/or the device 704 to capture three images, one from each of positions 706, 708, and 710. The positions 706, 708, and 710 may be determined based on various angles and/or poses determined by the user data capture component 722. These positions and/or data associated therewith may be associated with the images captured when the mobile device 704 is located at the respective positions. For example, an image captured by the mobile device 704 when the device is at position 706 may be associated with data associated with the position 706. An image captured by the mobile device 704 when the device is at position 708 may be associated with data associated with the position 708, and so forth. The user authorization system 720 and/or the user data capture component 722 may receive the captured images and/or video and associated data from the verified user 702's mobile device 704 and store this data for future retrieval and/or for processing by one or more other components.

By associating an image with its particular position (e.g., data indicating angle, position, pose, etc. of the device when the image was captured), improved three-dimensional representation may be generated (e.g., by a NeRF). A larger number of images from distinct positions may also improve the representations that may be generated for a verified user. This in turn may improve the ability of a user authorization system to determine correspondences to data provided with user authorization requests and reduce the number of false positive correspondences, thereby increasing the security provided by such user authorization systems.

Figure 8:
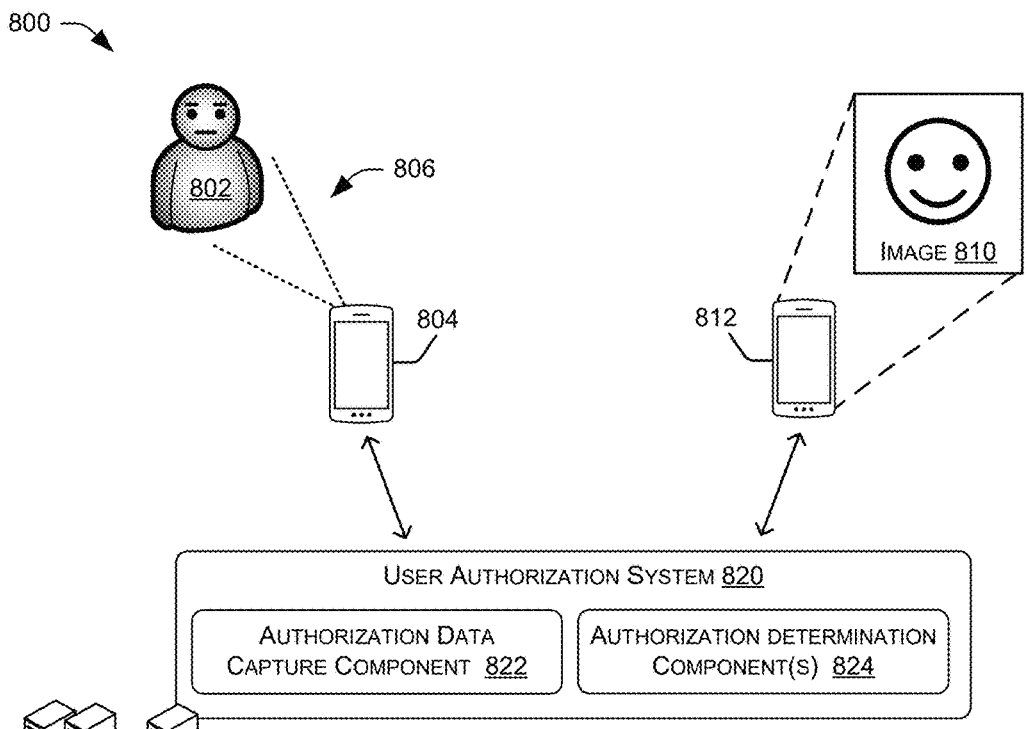
FIG. 8 illustrates an example environment including user devices and a user authorization system as disclosed herein.

FIG. 8 illustrates an example environment 800 that may include authorization requesting user's mobile devices 804 and 812 and a user authorization system 820. The devices 804 and 812 may each be any type of user device as described herein or any other type of user device. The user authorization system 820 may be any user authorization system as described herein (e.g., user authorization system 110) or any other user authorization system and may represent one or more physical and/or logical resources, such as one or more server computers, virtual machines, software resources, databases, notebooks clusters, datasets, etc., or any combination thereof. The user authorization system 820 may include an authorization data capture component 822 that may be similar to an authorization data capture component as described herein and/or may perform operations similar to those performed by authorization data capture components described herein (e.g., authorization data capture component 124). The user authorization system 820 may also include one or more authorization determination components 824 that may be similar to an authorization determination component as described herein and/or may perform operations similar to those performed by authorization determination components described herein (e.g., authorization determination component 138 and/or components configured therein).

A user 802 may be operating mobile device 804. The user authorization system 820 (e.g., the authorization data capture component 822) may receive user data captured from the position 806 of the mobile device 804. This user data may include image and/or video data that may be used in authorization operations (e.g., as described herein) to attempt to authorize the user 802. The authorization data capture component 822 may provide the received user data to the authorization determination component(s) 824 for authorization operations (e.g., liveness detection, two- and/or three-dimensional data generation, verified user comparisons, etc.).

For example, the user 802 may be a live person, and therefore the authorization determination component(s) 824 may determine, based on the user data received from the mobile device 804, that the user data is associated with a live person. The user 802 may further be a verified user, and therefore the authorization determination component(s) 824 may determine, based on the user data received from the mobile device 804, that the user data corresponds to verified user data associated with the user 802. The user authorization system 820 may then authorize the user 802 to access the mobile device 804.

Another user may be operating mobile device 812. The user authorization system 820 (e.g., the authorization data capture component 822) may receive user data from the mobile device 812 that includes an image of the image 810. The authorization data capture component 822 may provide the received user data to the authorization determination component(s) 824 for authorization operations (e.g., liveness detection, two- and/or three-dimensional data generation, verified user comparisons, etc.). The authorization determination component(s) 824 may determine, based on the user data received from the mobile device 812, that the user data is not associated with a live person. The user authorization system 820 may then deny the request to authorize user access the mobile device 812 based on the user data that include the image 810.

Figure 9:
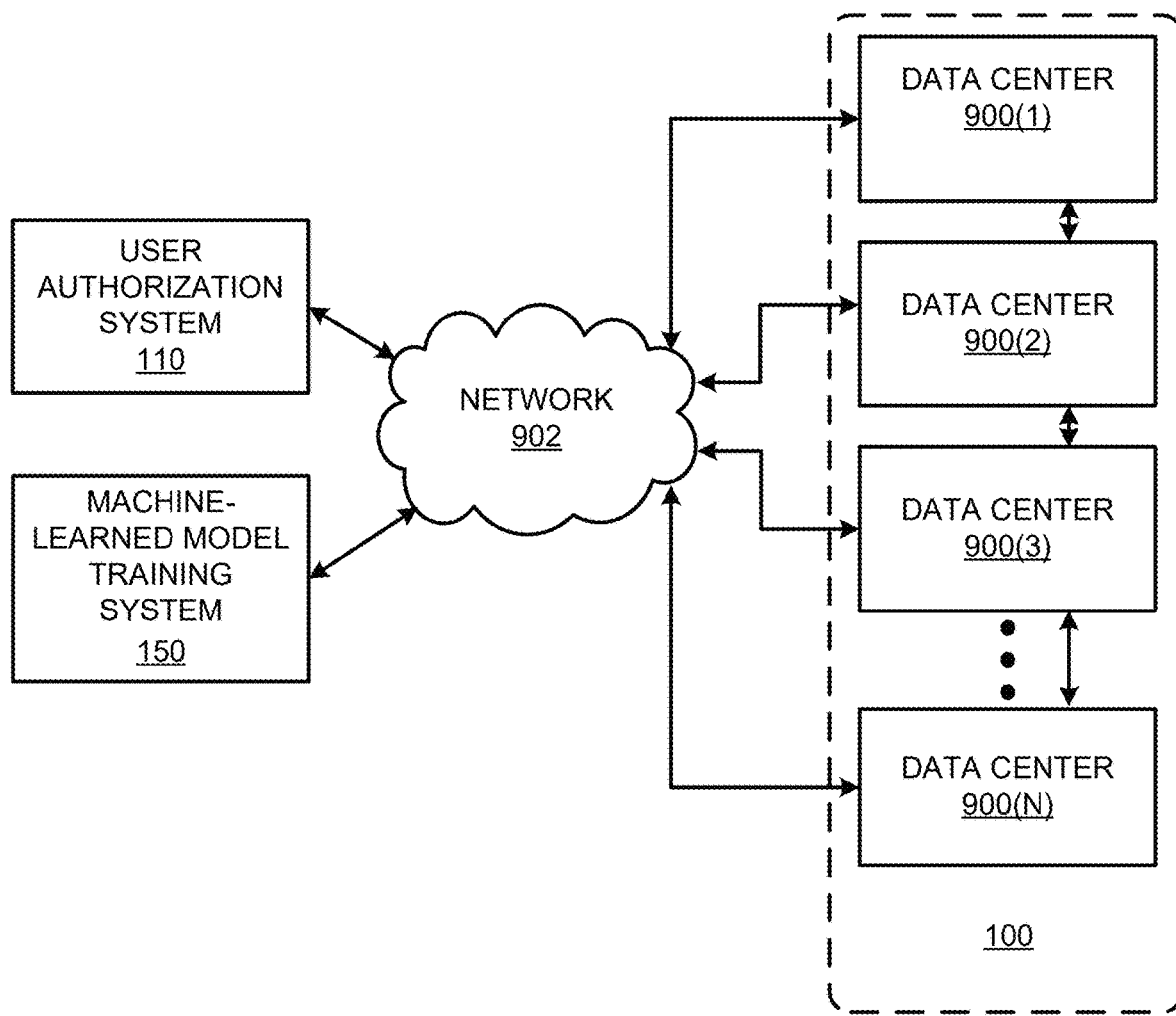
FIG. 9 is a system and network diagram that shows an illustrative operating environment that includes a system that can be configured to implement aspects of the functionality described herein.

FIG. 9 is a system and network diagram that shows an illustrative operating environment that includes a user authorization system 110 and a machine-learned model training system 150 that can be configured to implement aspects of the functionality described herein. The systems 110 and 150 can each execute and/or implement various types of computing and network services, such as the data storage and data processing, and/or utilize various computing resources of various types of systems on a permanent or an as-needed basis. Among other types of functionality, the computing resources utilized and/or implemented by the systems 110 and 150, or by a larger system of which one or more of these systems may be a part, can be utilized to implement the various user authorization operations and model training operations described herein. One or more of the systems 110 and 150 may be part of a larger system that provides additional computing resources that include, without limitation, data storage resources, data processing resources, such as virtual machine (VM) instances, networking resources, data communication resources, network services, and other types of resources.

Each type of computing resource utilized and/or implemented at the systems 110 and 150, or by a larger system of which one or more of these systems may be a part, can be general-purpose or can be available in a number of specific configurations. For example, data processing resources can be implemented as physical computers or VM instances in a number of different configurations. The VM instances can be configured to execute applications, including web servers, application servers, media servers, database servers, some or all of the user authorization operations and/or model training operations described above, and/or other types of programs. Data storage resources can include file storage devices, block storage devices, and the like. The systems 110 and 150, or a larger system of which one or more of these systems may be a part, can also be configured to perform other types of operations and/or utilize and/or implement other computing resources not mentioned specifically herein.

The computing resources utilized and/or implement by systems 110 and 150, or a larger system of which one or more of these systems may be a part, may be enabled in one implementation by one or more data centers 900(1), 900(2), 900(3), . . . , 900(N) that may be configured in (partially or wholly) and/or communicative connected to the environment 100. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as systems 110 and 150, and/or any of the computing resources in the environment 100, provided by the system over a network 902, which can be a wide area communication network ("WAN"), such as the Internet, an intranet, an Internet service provider ("ISP") network, or a combination of such networks. For example, and without limitation, a computing device (e.g., the user authorization system 110) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
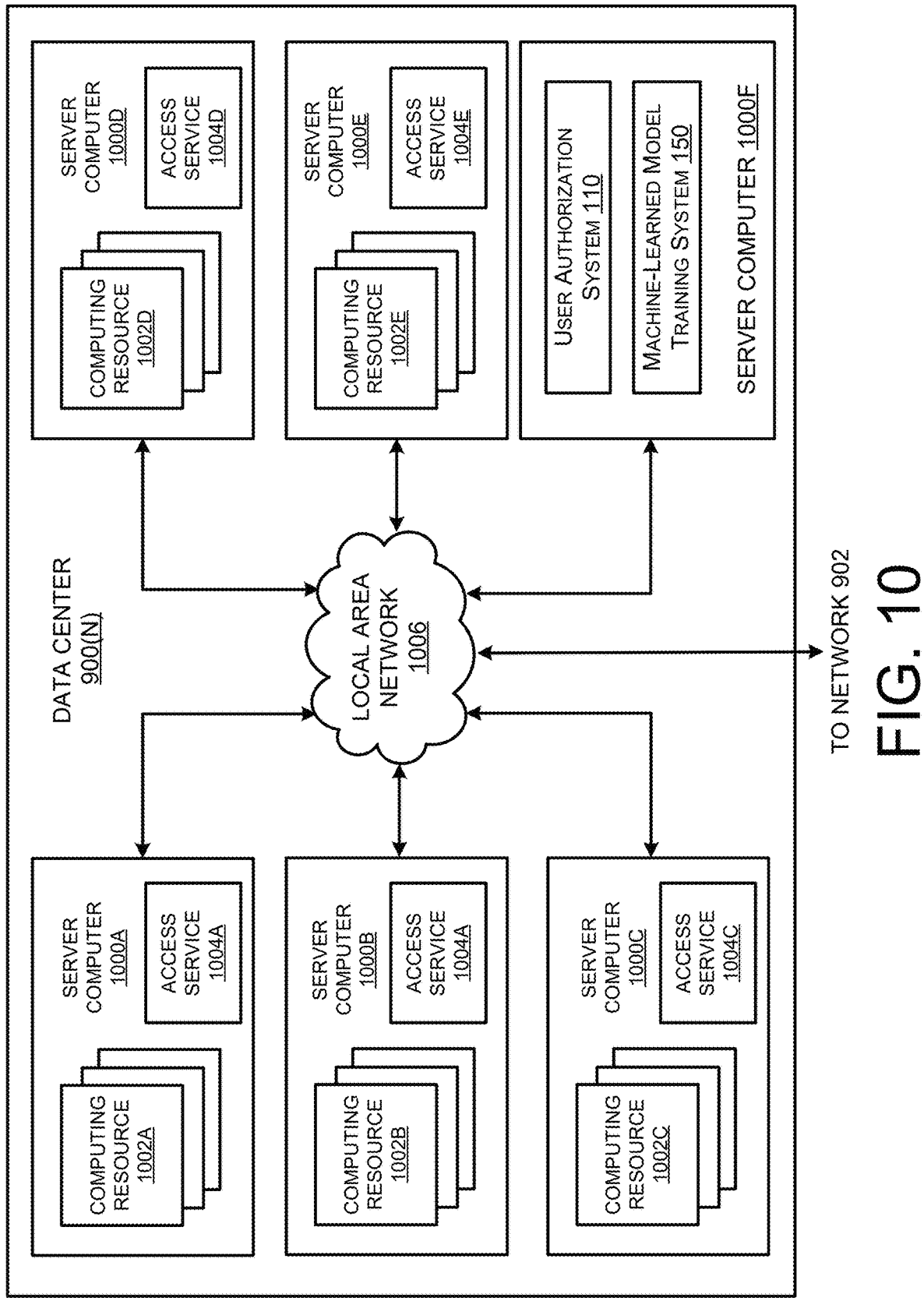
FIG. 10 is a computing system diagram illustrating a configuration for a data center that can be utilized to implement aspects of the technologies disclosed herein.

FIG. 10 is a computing system diagram that illustrates one configuration for a data center 900(N) that can be utilized to implement the systems 110 and 150, as described above in FIGS. 1-8 and/or any other user authorization and/or model training system disclosed herein. The example data center 900(N) shown in FIG. 10 includes several server computers 1000A-1000E (collectively 1000) for providing the computing resources 1002A-1002E (collectively 1002), respectively.

The server computers 1000 can be standard tower, rackmount, or blade server computers configured appropriately for providing the various computing resources described herein (illustrated in FIG. 10 as the computing resources 1002A-1002E). As mentioned above, the computing resources 1002 may be utilized and/or configured at one or more of systems 110 and 150, or a larger system of which these systems may be a part, and can include, without limitation, analytics applications, data storage resources, data processing resources such as VM instances or hardware computing systems, database resources, networking resources, model execution resources, model training resources, and others. Some of the servers 1000 can also be configured to execute access services 1004A-1004E (collectively 1004) capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute one or more of the systems 110 and 150 and/or one or more components associated therewith. The server computer 1000F can also be configured to execute other components and/or to store data for providing some or all of the functionality described herein. In this regard, it should be appreciated that components or different instances of one or more of the systems 110 and 150 can execute on many other physical or virtual servers in the data centers 900 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 900 described with reference to FIG. 10 is merely illustrative and that other implementations can be utilized.

Figure 11:
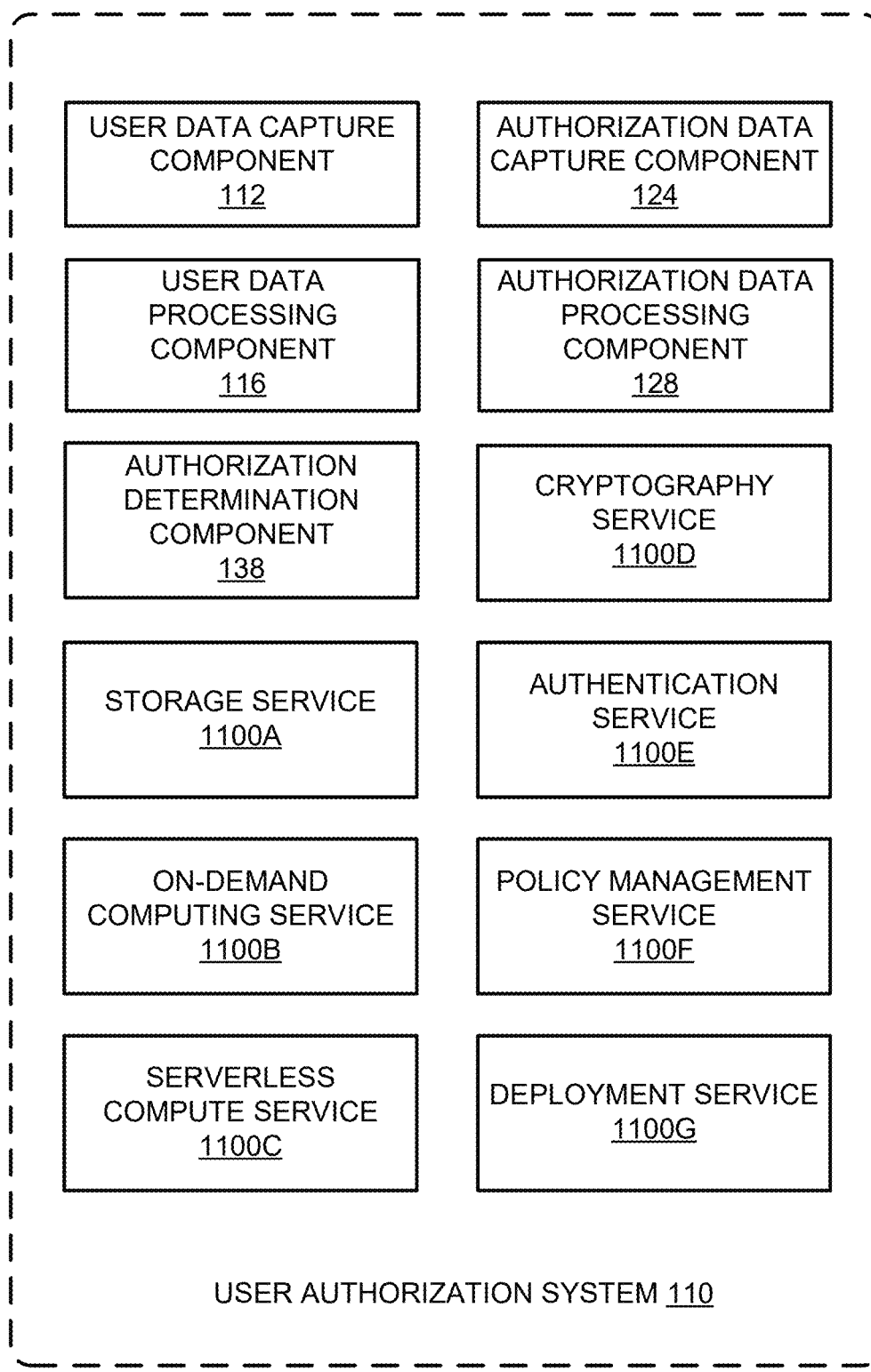
FIG. 11 is a network services diagram that shows aspects of several services that can be provided by and utilized within a system, or a larger system of which the system is a part, which is configured to implement the various technologies disclosed herein.

FIG. 11 is a system services diagram that shows aspects of several services that can be provided by and utilized within the systems 110 and 150 and/or a larger system of which these systems may be a part, which is configured to implement the various technologies disclosed herein. In particular, and as discussed above, these systems, or a larger system of which these systems may be a part, can provide a variety of services to users and other users including, but not limited to, user data services performed by user data capture component 112 and/or user data processing component 116, authorization data services performed by authorization data capture component 124 and/or authorization data processing component 128, user authorization services performed by authorization determination component 138, and/or one or more computing instances performing one or more functions thereof; a storage service 1100A; an on-demand computing service 1100B; a serverless compute service 1100C; a cryptography service 1100D; an authentication service 1100E; a policy management service 1100F; and a deployment service 1100G. The system, or a larger system of which the system is a part, can also provide other types of computing services, some of which are described below.

It is also noted that not all configurations described include the services shown in FIG. 11 and that additional services can be provided in addition to, or as an alternative to, the services explicitly described herein. Each of the systems and services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system and/or from computing resources in the system, or a larger system of which the system is a part. The data stored by the storage service 1100A can be obtained from computing devices of users. The data stored by the storage service 1100A may also be activity data logged to the storage system 1100A that may be functioning as a logging system or service.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless compute service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionality not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1100B) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g., API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
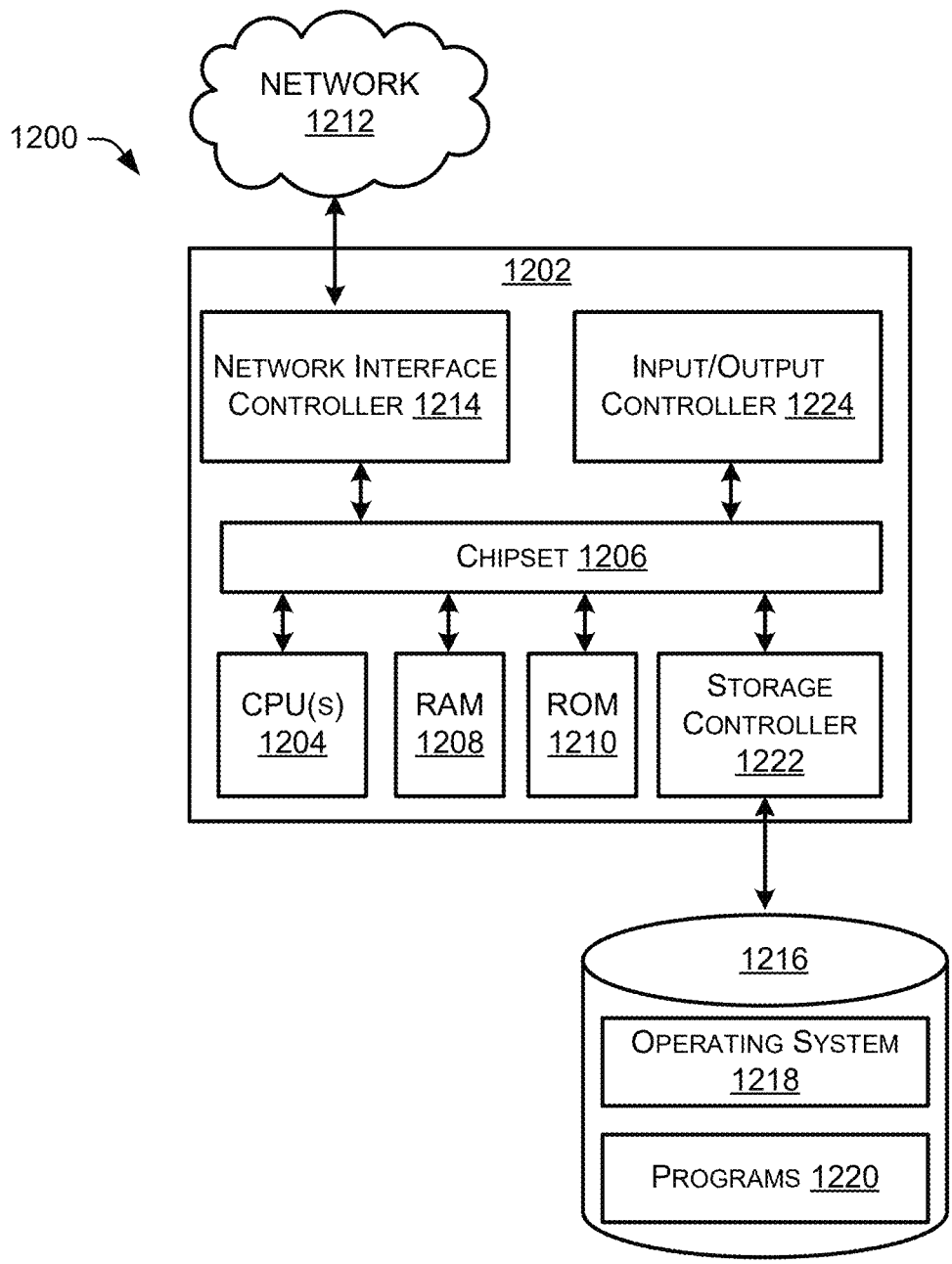
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a user authorization system, a model training system, and/or other systems and components described herein.

The computer 1200 includes a baseboard 1202, or "motherboard," which may be one or more printed circuit boards to which a multitude of components and/or devices may be connected by way of a system bus and/or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1212. The chipset 1206 can include functionality for providing network connectivity through a NIC 1214, such as a gigabit Ethernet adapter. The NIC 1214 is capable of connecting the computer 1200 to other computing devices over the network 1212. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for providing closed loop change management services and sorting and retrieving activity data based on a session identifier have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   determining, at a user authorization system, a plurality of images and a plurality of mobile device positions, wherein individual images of the plurality of images correspond to a respective position of the plurality of mobile device positions;
   transmitting, from the user authorization system to a first user mobile device associated with a verified user and based on the plurality of mobile device positions, instructions to capture the plurality of images;
   receiving, from the first user mobile device at the user authorization system, first image data comprising the plurality of images;
   generating, at the user authorization system and based on the first image data and the plurality of mobile device positions, first representation data comprising three-dimensional representation data;
   receiving, at the user authorization system and from a second mobile device, a request for authorization to access the second mobile device, the request comprising second image data comprising an image;
   determining, at the user authorization system and based on the image of the request for authorization to access the second mobile device, three-dimensional correspondence points for the image of the request for authorization to access the second mobile device;

determining, at the user authorization system and based on the three-dimensional correspondence points, that the image of the request for authorization to access the second mobile device is associated with a live person;
generating, at the user authorization system and based on determining that the image of the request for authorization to access the second mobile device is associated with the live person, second representation data;
determining, at the user authorization system, that the second representation data corresponds to the first representation data; and
transmitting, from the user authorization system to the second mobile device and based on determining that the second representation data corresponds to the first representation data, an authorization to access the second mobile device.

2. The method of claim 1, wherein generating the first representation data comprises providing a face mesh based on the plurality of images as input to a machine-learned model executing at a neural radiance field to generate the three-dimensional representation data as output.

3. The method of claim 1, wherein:
determining the three-dimensional correspondence points for the image of the request for authorization to access the second mobile device comprises using structure-from-motion estimates based on the image of the request for authorization to access the second mobile device to determine the three-dimensional correspondence points; and
determining that the image of the request for authorization to access the second mobile device is associated with the live person comprises:
determining a fit measurement based on the three-dimensional correspondence points; and
determining that the fit measurement meets or exceeds a threshold.

4. A method comprising:
receiving, at a user authorization system from a mobile device, a request for authorization to access the mobile device, the request comprising image data;
determining, at the user authorization system and based at least in part on the image data, three-dimensional correspondence points;
determining, at the user authorization system and based at least in part on the three-dimensional correspondence points, that the image data is associated with a live person;
generating, at the user authorization system and based at least in part on determining that the image data is associated with the live person, a first representation;
determining, at the user authorization system, that the first representation corresponds to a second representation associated with a verified user; and
transmitting, from the user authorization system to the mobile device and based at least in part on determining that the first representation corresponds to the second representation associated with the verified user, an authorization to access the mobile device.

5. The method of claim 4, wherein generating the first representation comprises executing a neural radiance field using the image data as input to generate the first representation as output.

6. The method of claim 5, wherein using the image data as the input comprises:
generating a face mesh based at least in part on the image data using one or more three-dimensional morphable face models; and
using the face mesh as the input.

7. The method of claim 6, wherein generating the face mesh comprises applying depth supervision to the face mesh.

8. The method of claim 4, wherein the image data comprises one or more of:
a first image and mobile device position data associated with the first image; or
a second image and mobile device sensor data associated with the second image.

9. The method of claim 4, wherein determining that the image data is associated with the live person comprises determining that a fit measurement associated with the three-dimensional correspondence points meets or exceeds a threshold.

10. The method of claim 4, wherein determining that the first representation corresponds to the second representation comprises determining that the first representation has at least a threshold percentage of similarity to the second representation.

11. The method of claim 4, further comprising:
receiving a second request for authorization to access a second mobile device, the request comprising second image data;
determining, based at least in part on the second image data, second three-dimensional correspondence points;
determining, based at least in part on the second three-dimensional correspondence points, that the second image data is not associated with the live person; and
transmitting, based at least in part on determining that the second image data is not associated with the live person, a denial of access to the second mobile device.

12. The method of claim 11, wherein determining that the second image data is not associated with the live person comprises determining that a fit measurement associated with the second three-dimensional correspondence points is less than a threshold.

13. The method of claim 4, wherein:
the first representation comprises first two-dimensional representation data;
the second representation comprises three-dimensional representation data; and
determining that the first representation corresponds to the second representation comprises:
determining second two-dimensional representation data based at least in part on the three-dimensional representation data; and
determining that the first two-dimensional representation data corresponds to the second two-dimensional representation data.

14. A system comprising:
one or more processors; and
one or more computer-readable storage media storing computer-executable instructions that, when executed by the one or more processors, cause a user authorization system to perform operations comprising:
determining a plurality of images and image parameters;
transmitting instructions to a first mobile device of a verified user to capture the plurality of images, wherein the instructions are based at least in part on the image parameters;
receiving the plurality of images from the first mobile device;
generating three-dimensional representation data based at least in part on the plurality of images;

receiving a request for authorization to access a second mobile device, the request comprising an image;

generating a first representation based at least in part on the image of the request for authorization to access the second mobile device; and transmitting an authorization to access the second mobile device based at least in part on determining that the first representation corresponds to a second representation that is based at least in part on the three-dimensional representation data.

15. The system of claim 14, wherein generating the three-dimensional representation data comprises executing a neural radiance field using the plurality of images as input to generate the first three-dimensional representation as output.

16. The system of claim 15, wherein using the plurality of images as the input comprises:

generating a face mesh using one or more three-dimensional morphable face models based at least in part on the plurality of images; and using the face mesh as the input.

17. The system of claim 14, wherein the operations further comprise executing a neural radiance field using the three-dimensional representation data as input to generate the second representation.

18. The system of claim 17, wherein the neural radiance field is further executed using at least one of angle data associated with the image of the request for authorization to access the second mobile device or position data associated with the image of the request for authorization to access the second mobile device as the input to generate the second representation.

19. The system of claim 14, wherein transmitting the authorization to access the second mobile device is further based at least in part on determining, based at least in part on the image of the request for authorization to access the second mobile device, that the image of the request for authorization to access the second mobile device represents a live person.

20. The system of claim 14, wherein:

the image parameters comprise a plurality of distinct device positions; and individual positions of the plurality of distinct device positions are associated with respective images of the plurality of images.

\* \* \* \* \*